(12) United States Patent
Papadoglou et al.

(10) Patent No.: US 8,340,655 B2
(45) Date of Patent: Dec. 25, 2012

(54) DATA TRANSMISSION

(75) Inventors: Nick Papadoglou, Athens (GR); Bulent Ozgur Gurleyen, Reading (GB)

(73) Assignee: Vodafone Group PLC, Newbury, Berkshire (GB)

( * ) Notice: Subject to any disclaimer, the term of this patent is extended or adjusted under 35 U.S.C. 154(b) by 880 days.

(21) Appl. No.: 11/569,427

(22) PCT Filed: May 16, 2005

(86) PCT No.: PCT/GB2005/001942
§ 371 (c)(1),
(2), (4) Date: Dec. 12, 2007

(87) PCT Pub. No.: WO2005/114958
PCT Pub. Date: Dec. 1, 2005

(65) Prior Publication Data
US 2008/0214175 A1    Sep. 4, 2008

(30) Foreign Application Priority Data
May 20, 2004  (GB) .................................. 0411269.4

(51) Int. Cl.
*H04W 4/00* (2009.01)
(52) U.S. Cl. ..................... 455/422.1; 455/455; 455/453; 370/338; 370/395.5
(58) Field of Classification Search .............. 455/422.1, 455/455, 453; 370/395.5, 338
See application file for complete search history.

(56) References Cited

U.S. PATENT DOCUMENTS

| | | | |
|---|---|---|---|
| 7,356,031 B1 * | 4/2008 | Toebes et al. .................. | 370/392 |
| 7,519,010 B1 * | 4/2009 | Aggarwal et al. ............. | 370/254 |
| 7,519,834 B1 * | 4/2009 | Dondeti et al. ............... | 713/193 |
| 2002/0026525 A1 * | 2/2002 | Armitage ....................... | 709/238 |
| 2002/0057669 A1 * | 5/2002 | Joung ............................ | 370/351 |
| 2002/0198980 A1 * | 12/2002 | Najafi ........................... | 709/224 |
| 2003/0036392 A1 * | 2/2003 | Yukie ............................ | 455/461 |
| 2003/0114158 A1 * | 6/2003 | Soderbacka et al. ........... | 455/436 |
| 2003/0204619 A1 * | 10/2003 | Bays .............................. | 709/238 |
| 2003/0227923 A1 * | 12/2003 | Brumm .......................... | 370/395.5 |
| 2004/0001508 A1 * | 1/2004 | Zheng et al. .................. | 370/466 |
| 2004/0002955 A1 | 1/2004 | Gadbois et al. | |
| 2004/0090919 A1 * | 5/2004 | Callon et al. .................. | 370/237 |
| 2004/0103277 A1 * | 5/2004 | Seada et al. .................... | 713/160 |

(Continued)

FOREIGN PATENT DOCUMENTS

JP      5030139      2/1993

(Continued)

*Primary Examiner* — Jinsong Hu
*Assistant Examiner* — Qun Shen
(74) *Attorney, Agent, or Firm* — Workman Nydegger

(57) ABSTRACT

A communications device (1) communicates with an access point (7) to gateway (21) and local area network (13) by a wired or wireless communications link (9). These components may, for example, be accommodated on a train or serve some other predefined area. Gateway (21) receives data packets from device (1) representing information for transmission via that device's "home" communication system (15) to a destination device. The gateway (21) creates packet data protocol channels (27,29,31) with a plurality of communication systems (15,23) and (25) and sends the data packets received from the device (1) selectively over each of these communications channels (27,29,31). A link between a communications systems (23) and (25) allows the data packets to be forwarded to the communications system (15) where they are compiled by concentrator (49) for onward transmission. The communication systems (15,23,25) may be mobile or cellular communications systems.

31 Claims, 3 Drawing Sheets

U.S. PATENT DOCUMENTS

| | | | |
|---|---|---|---|
| 2004/0148352 A1* | 7/2004 | Menon et al. | 709/205 |
| 2004/0203801 A1* | 10/2004 | Chitrapu | 455/445 |
| 2005/0119001 A1* | 6/2005 | Watanabe | 455/436 |
| 2005/0237982 A1* | 10/2005 | Pankajakshan et al. | 370/338 |
| 2006/0050667 A1* | 3/2006 | Verma et al. | 370/338 |
| 2006/0173968 A1* | 8/2006 | Vaarala et al. | 709/214 |
| 2007/0087748 A1* | 4/2007 | Du et al. | 455/436 |
| 2010/0083364 A1* | 4/2010 | Fernandez Gutierrez | 726/13 |

FOREIGN PATENT DOCUMENTS

| | | |
|---|---|---|
| WO | WO 96/21184 | 7/1996 |
| WO | WO 9621184 A1 * | 7/1996 |

* cited by examiner

DATA TRANSMISSION

TECHNICAL FIELD

This invention relates to a method of and apparatus for transmitting data between devices.

BACKGROUND ART

Systems are known which allow a connection to a user's home cellular network provider in an environment where no dedicated connection to the user's cellular network provider is available by providing a gateway which is able to offer multiple different technologies (for example, satellite communications and cellular communications). Such systems act to transmit the user data using a chosen one of the technologies offered, with the most suitable technology being chosen dependent on the coverage and quality available.

It is also known to transmit user data from a single terminal to the user's home cellular network over multiple packet data protocol (PDP) data channels.

DISCLOSURE OF INVENTION

According to the invention there is provided a method of transmitting information between a first device and a second device, the method including transmitting respective data packets representing information from one of said devices over different ones of a plurality of communications systems such that the data packets are received by the other of said devices and the information represented thereby may be used.

According to the invention there is also provided apparatus for transmitting information between a first device and a second device, including means for transmitting respective data packets representing information from one of said devices over different ones of a plurality of communications systems such that the data packets are received by the other of said devices and the information represented thereby may be used.

BRIEF DESCRIPTION OF DRAWINGS

A method of and apparatus for transmitting data will now be described, by way of example only, with reference to the accompanying drawing in which.

In the drawings like elements are designated the same reference numeral.

BEST MODE FOR CARRYING OUT THE INVENTION

Figure 1:
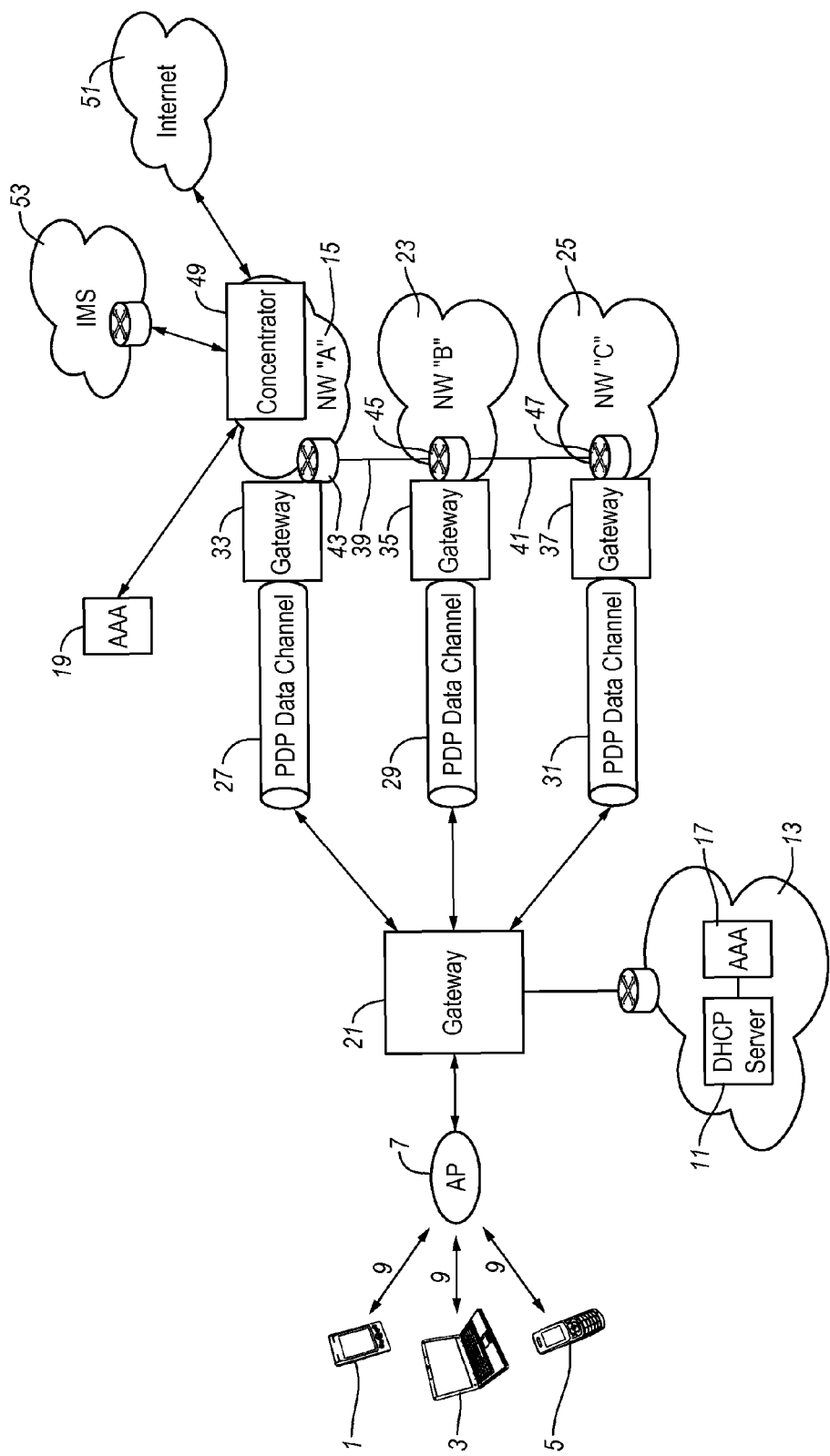
FIG. 1 is a diagrammatic representation of elements used in the embodiment of the invention.

One way in which IP data packets could be distributed between a user and a service provider in accordance with the invention is shown in FIG. 1. This drawing shows the system from the service level.

User terminals 1, 3, 5 are able to connect to an access point 7 via any suitable connection 9 (which for example may be a wireless connection such as a cellular radio connection, Bluetooth connection or infra-red connection, or may be a connection via a cable). The access point 7 may be a wireless local area network (WLAN) hot spot, a wireless fidelity (WiFi) access point, or any other access point providing access to a remote communications network. The access point 7 may be provided in a moving environment (for example, on a train) or in a fixed environment where users may wish to access the remote communications network.

The user terminals may, for example, comprise mobile (cellular) telephones, personal digital assistance (PDAs), laptop computers or the like. It is not essential that the user terminals 1,3 and 5 have the facility to communicate with a mobile telecommunications network such as a GSM or 3G/UMTS network. If the user terminals 1,3 and 5 do have this functionality they will be provided with a SIM or USIM that allows authentication of the device with a mobile telecommunications network in the known manner. Alternatively, the user devices are provided with any other means of communication with the access point 7. The user terminals may have the facility to use multiple communications media for communicating with the access point 7.

In the embodiment to be described each of the user terminals 1,3 and 5 are registered with a home cellular telecommunications network 15 to obtain communications services therefrom and to allow connection to a service provider such as an internet service provider (for example, a train station or airport). There is no requirement for the user terminals 1,3,5 to be in an area where there is coverage by the home cellular network 15 in order to communicate with the access point 7.

Once a terminal 1, 3, 5 has been connected to the access point 7 it is assigned a random IP address by the Dynamic Host Configuration Protocol (DHCP) server 11 of the local area network (LAN) 13 that may be provided in the specific environment (for example, on board a train, at a train station or at an airport) of the access point 7. Communications between the access point 7 and the LAN 13 are routed via gateway transmitter (BGW-T) 21, to be described in further detail later. The user of any of the terminals 1, 3, 5 is at that point able to access any services available on a local intranet provided within the specific environment.

If the user of any of the terminals 1, 3, 5 requires access to their home cellular network 15 and the services provided by their home cellular network operator, the terminal 1, 3, 5 is authenticated with the network. Authentication may be provided between the AAA (Authentication, Authentication and Accounting) proxy server 17 of the LAN 13 and the AAA proxy server 19 of the user's home cellular network 15. It is preferable for this authentication to be SIM- or USIM-based (using the SIM or USIM associated with the relevant terminal 1,3,5) but could also be provided by any suitable alternative authentication procedure, such as a username/password scheme. For example, if the authentication is SIM-based (that is, a user terminal is authenticated using data stored on a SIM associated with—and typically housed within—that terminal) the authentication will be performed by exchange of data between the user terminal 1,3,5 and the AAA proxy server 17 (via intermediate components shown in FIG. 1) and in turn by an exchange of data between the AAA proxy server 17 and the AAA proxy server 19 of the user's home cellular network (again via the intermediate components shown in FIG. 1, to be described in more detail later). For example, AAA proxy server 19 may send a random challenge to the AAA proxy server 17, which is transmitted to the SIM of the relevant terminal. The SIM responds by encrypting the random challenge using both an authentication algorithm and a unique key Ki resident within the SIM and previously assigned to that particular SIM by the home network 15. The encrypted response of the SIM is transmitted by the terminal to the AAA proxy server 17, and from there to the AAA proxy server 19. The AAA proxy server 19 analyses the response to determine whether it is the response that will be expected from that particular SIM. If the response is as expected, then the AAA proxy server 19 considers the SIM to be authenticated with the network 15.

Once the user is authenticated to their home cellular network operator, their terminal 1, 3, 5 is assigned a new IP address by the DCHP server 11 of the LAN 13. This IP address is assigned from a pool of such IP addresses held by the LAN to be assigned to subscribers of their home cellular network operator.

The user is now in a position to access their home cellular network and the services provided by their home cellular network operator. Such communication between the user and their home cellular network comprises the exchange of IP data packets between the user and the cellular network operator.

The embodiment describing this distribution focuses on transmission of IP data packets from the user terminals 1, 3, 5 to the user's home cellular network 15. Of course the invention is equally applicable to the transmission of IP data packets in the opposite direction, i.e. from the user's home cellular network 15 to the user terminals 1, 3, 5.

In FIG. 1, three cellular networks are available: the user's home cellular network 15 (network "A"), network "B" 23 and network "C" 25. This allows three PDP data channels 27, 29, 31 to be created—PDP data channel 27 corresponding to network "A" 15, PDP data channel 29 corresponding to network "B" 23 and PDP data channel 31 corresponding to network "C" 25. IP data packets are transmitted from the user terminals 1, 3, 5 to the user's home network operator 15 through the gateway transmitter (BGW-T) 21. IP data packets received in the BGW-T 21 from the user terminals are transmitted towards their intended destination (the user's home cellular network 15) by the BGW-T 21. The BGW-T 21 includes a plurality of SIM or USIM cards. The SIM or USIM cards allow the BGW-T 21 to communicate with the networks 15,23,25 by authenticating the BGW-T 21 with those networks using information stored on the SIM or USIM. The SIM or USIM includes data similar to that stored on a SIM or USIM that would be provided with a user terminal for use with the network, such as an authentication algorithm and a unique key Ki. The SIMs or USIMs provided on the BGW-T 21 may not be in the physical form of a SIM card. Instead, they could be virtual or simulated SIMs that are implemented by software.

According to an important feature of the embodiment, the BGW-T 21 transmits the IP data packets over multiple PDP data channels irrespective of the cellular network operator with which the relevant terminal 1,3,5 generating the data packets is registered. This is done using multiple PDP contexts, with a different PDP context for each operator. Therefore, even though the user holds a subscription to the operator of network "A" 15, IP data packets sent by the user will be routed through the BGW-T 21 and over network "B" 23 (and hence through PDP data channel 29) and/or network "C" 25 (and hence through PDP data channel 31) as well as over network "A" 15 (and hence through PDP data channel 27).

It should be appreciated that the invention is also applicable to an arrangement where some or all of the networks 15,23 and 25 are not cellular telecommunications networks but are some other type of communications network. For example, one or more of the networks could be a satellite communications network. There may be only two networks, or four or more networks. According to the invention, data may be transmitted by the user terminal to its home network (which may or may not be a cellular telecommunications network) using a combination of different communications technologies.

The networks 15,23,25 are separate or discrete in the sense that they have a separate core for routing data between devices registered therewith and/or in the sense that they do not share a radio access network/base station transceivers. The networks may be operated by different (legal) entities and/or have separate facilities for authenticating user devices and charging users of devices registered therewith for use of the network.

A network address translation (NAT) process is required for IP version 4 (IPv4) addresses, to convert those IP addresses assigned to user terminals 1, 3, 5 by the DHCP server 11 of the LAN 13 into the IP addresses originally allocated to the LAN 13 provider by the operators of the cellular networks 15, 23, 25. The NAT process only affects the IP addresses of the IP data packets that the BGW-T 21 transmits.

Upon receiving IP data packets from the user terminals 1, 3, 5 the BGW-T 21 monitors the availability and radio condition of the radio link of each of the cellular networks 15, 23, 25 in order to determine the most effective routing for the IP data packets. The availability of each radio link is assessed in terms of the level of the signal given by the various different radio links, while the radio conditions of each radio link are assessed via test signalling sent from the BGW-T 21 through the various different radio links. The BGW-T 21 contains a scheduling algorithm which enables the IP data packets to be distributed and hence transmitted over different PDP data channels 27, 29, 31 (as will be described in more detail below with reference to FIG. 2) according to, for example, the load or signal strength of each PDP data channel 27, 29, 31. By distributing the IP data packets over the plurality of available data channels 27, 29, 31 offered by the operators of multiple cellular networks 15, 23, 25, the user experiences an increase in the bandwidth available without the need for the deployment of extra capacity for each cellular network operator, leading to an increase in the data capacity available to users in an environment where no dedicated connections to cellular network providers are available in comparison to a system using a single cellular network radio link. Additionally, potential bottleneck situations are avoided, and there is an increase in the bandwidth offered to users without the need for deploying extra capacity per cellular network 15, 23, 25 operator and the provision of unified charging through the IP core of the cellular network is available.

The IP data packets distributed and transmitted by the BGW-T 21 over respective data channels 27,29,31 are received by a gateway receiver (BGW-Rs) 33, 35, 37 (associated with each of the channels) which correspond respectively to the cellular networks 15, 23, 25. Once the distributed IP data packets are received in the BGW-Rs 33, 35, 37, they are assembled and routed to the appropriate cellular network 15, 23, 25 over dedicated inter-operator links 39, 41 using routers 43, 45, 47 contained respectively within the BGW-Rs 33, 35, 37. Each cellular network may comprise a concentrator which acts to re-assemble the IP data packets into the form they took when originally transmitted by the user terminal 1, 3, 5 before they were distributed and transmitted by the BGW-T 21.

For clarity FIG. 1 shows only one concentrator 49 which is associated with network "A" 15, but network "B" 23 and network "C" 25 may also have a dedicated concentrator associated with them. If a network does not have a concentrator associated with it, a user terminal registered with that network may be able to transmit and receive data packets but will not be able to use services offered by the operator.

The transmission of the IP data packets from networks 23,25 over links 39,41 and the re-assembly of the IP data packets by the concentrator 49 completes the transmission of the IP data packets between the user and the network 15 operator, and the data sent by the user is then able to be forwarded to the service provider of the particular service as originally intended by the user.

For example, the IP data packets may be forwarded by the concentrator 49 to the Internet 51 or to IP-based multimedia subsystem (IMS) 53.

An IPsec tunnel (to be described in more detail below) created between the user terminal 1,3,5 and the concentrator 49 may terminate at the concentrator 49 or at a remote site, using a virtual private network (VPN) service. For example, the IPsec tunnel may be continued using the IMS 53.

IMS is a set of core network servers sitting behind the GGSN of the network operator 15 in the packet switched domain. These servers are introduced in order to process signalling between end users. The aim of IMS is to allow users such as mobile telephone network operators to provide services to their subscribers as efficiently and effectively as possible. For example, the IMS architecture is likely to support the following communication types: voice, video, instant messaging, "presence" (a user's availability for contact), location-based services, email and web. Further communication types are likely to be added in the future. This diverse collection of communication devices requires efficient session management due to the number of different applications and services that will be developed to support these communication types. Session Initiation Protocol (SIP) is used for managing these sessions.

In order to complete the operation, the concentrator 49 may have to assign a further IP address to the user terminal 1, 3, 5 depending on the need for access to particular operator-specific services.

IP data packets may of course be transmitted in the reverse direction, that is from the home cellular network 15 to the relevant user terminal 1,3,5. Data packets arrive at the concentrator 49 and are then distributed/sent to each BGW-R 33,35,37 in each cellular network 15,23,25 for transmission by respective PDP data channels 27,29,31 to BGW-T 21, where the IP data packets are assembled and transmitted to the appropriate user terminal 1,3,5. It should be noted that, although BGW-T 21 is referred to as a "gateway transmitter" and that BGW-Rs 33,35,37 are referred to as "gateway receivers" to simplify the above explanation, these components in fact can each perform both transmission and receiving functions.

In the embodiment the use of the networks 15,23,25 is charged to the entity that operates the access point 7 and LAN 13. If, as in the embodiments described, these components are present on a train, the train operator will pay the network operators 15,23 and 25 for transmission of data. The charge may conveniently be based on a number of bytes transmitted and received by each operator on behalf of the train operator. The number of bytes transmitted/received may be measured by BGW-T 21 and BGW-Rs 33,35,37 and this information then passed to the relevant network 15,23,25 for charging the train operator.

The train operator may offer free data transmission and access to a user's home cellular network 15 as an incentive for a user of a terminal 1,3,5 to use that particular train operator's transport service. Alternatively, a fixed charge could be added to a ticket purchased for travel with the train operator. Alternatively, a mechanism could be employed for charging a user on a per byte of data transmitted basis.

Because a user is able to access their home cellular network 15 via the LAN 17, the mechanism by which the IP data packets are transmitted between the user's terminal 1,3 and 5 and the users home cellular operator 15 is transparent to the user, and the user can make use of all the services provided by its home network operator 15 in apparently the same manner as is possible with a normal direct cellular radio connection between the users terminal 1,3 and 5 and the network operator 15 (although with improved data rates).

Figure 2:
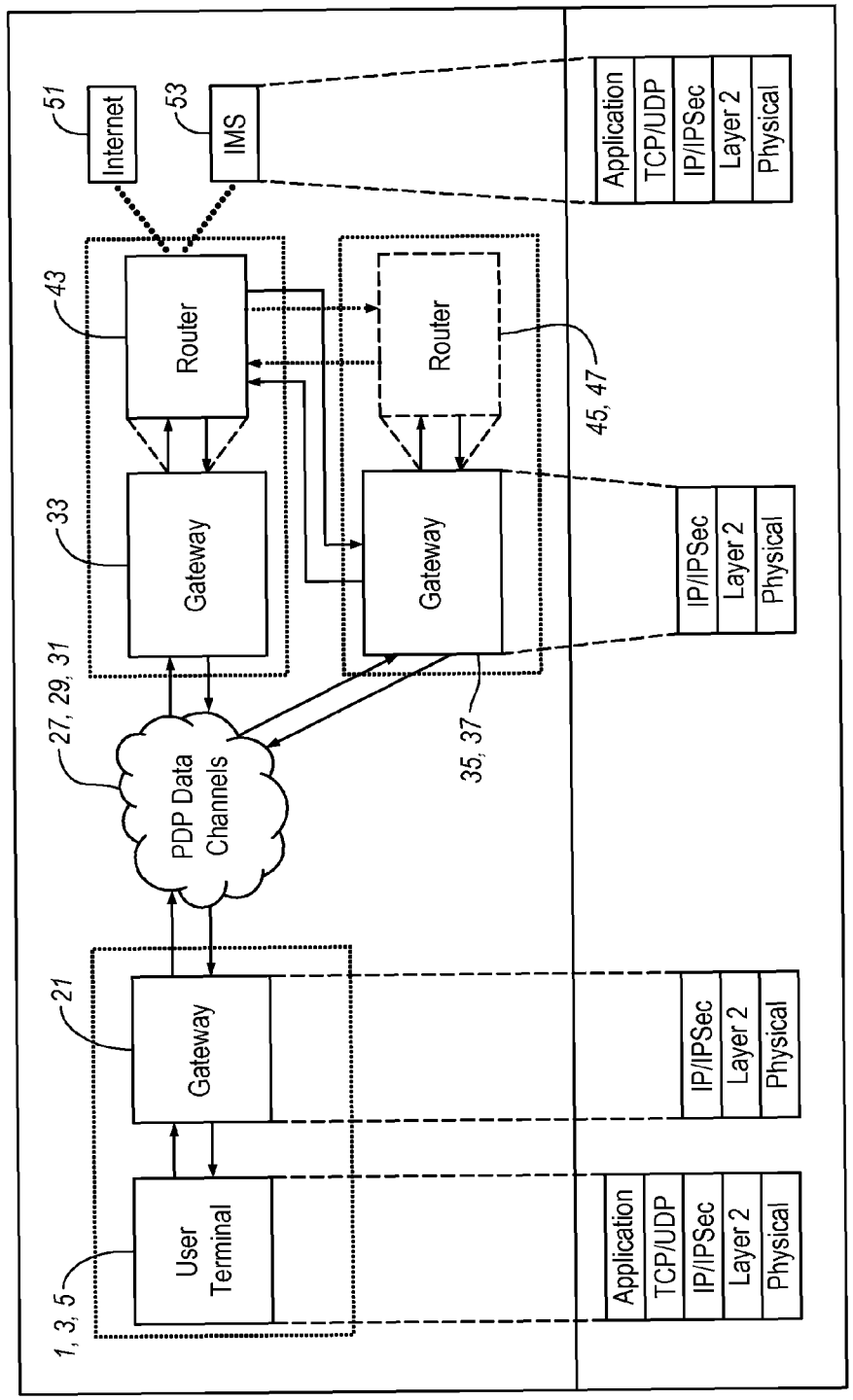
FIG. 2 is a logical diagram of the IP load balancing method showing the corresponding protocol stacks.

FIG. 2 shows a logical diagram of the IP load balancing method in accordance with the present invention. The upper panel of FIG. 2 corresponds generally to FIG. 1, while the lower panel of FIG. 2 shows the networking framework according to the Open Systems Interconnection (OSI) reference model, corresponding to the arrangement shown in FIG. 1 and the upper panel of FIG. 2. The OSI model divides the functions of a protocol into a series of layers, each layer only using the functions of the layer below and only exporting functionality to the layer above. In FIG. 2, control starts in the application layer of the user terminal 1, 3, 5. The application layer provides application services in the user terminal 1, 3, 5 for network software services such as file transfers and email. In order to transfer IP data packets as described above with reference to FIG. 1, control in the terminal 1, 3, 5 is passed down from one layer to the next in order for control to be passed to the BGW-T 21 and distributed over the data channels 27, 29, 31 to the BGW-Rs 33, 35, 37 and from the BGW-Rs 33, 35, 37 onto the services 51, 53 to be accessed by the user. In the services 51, 53 control is passed back up the hierarchy to the application layer.

In implementing the OSI model with reference to FIG. 2 the physical layer and layer 2 represent the media section, the network layer (comprising IP and IP security protocols) and the transport layer (comprising transmission control protocol (TCP) and user datagram protocol (UDP)) represent the transport section and the application layer represents the application section.

In known systems, control has to pass to the physical layer, or at least to the media section, before the data packets are able to be transported over the channel. It is a feature of this embodiment that control only has to pass down to the network layer before the data packets can be distributed and transmitted over the data channels 27, 29, 31, thereby allowing the user data to be transmitted between the user terminal 1, 3, 5 and the provider of the services 51, 53 as IP data packets.

As the embodiment allows distribution and transmission of IP data packets, it will be able to offer a high level of security for the transmission of user data, as described herein with reference to FIG. 1 and FIG. 2, as security is provided at the network layer of the OSI model, offering protection for IP and upper layer protocols. A tunnelling mechanism such as IP security (IPSec) in tunnel mode or IP-in-IP layer 3 tunnelling protocol (IPinIP) is preferably employed, depending on the security requirements of the user and/or the cellular network operator associated with the concentrator 43, 45, 47.

The IPSec protocol implements network layer encryption and authentication, thereby providing end-to-end security in the network architecture at the IP layer which can be used by any higher layer protocol, for example TCP or UDP—both of which reside in the transport layer (layer 4 of the OSI model). The IPSec protocol can be used in IPv4 and IPv6 networks and combines several different security technologies into a complete system. In particular, IPSec uses: Diffie-Hellman key exchange (for deriving key material between peers on a public network), public key cryptography (for signing the Diffie-Hellman exchanges to guarantee the identity of the two parties and avoid man-in-the-middle attacks), bulk encryption algorithms (for encrypting the data), keyed hash algorithms combined with traditional hash algorithms (for providing packet authentication) and digital certificates (signed by a certificate authority to act as digital ID cards).

In use, the IPSec protocol defines a new set of headers to be added to the IP data packets, the new headers being placed before the transport layer protocol and providing information for securing the payload of the IP data packets. These two new headers are the authentication header (AH), which ensures the authenticity of the data, and the encapsulating security payload (ESP), which protects the confidentiality, integrity and authenticity of the data. Both AH and ESP can function in either transport mode, providing security for upper level protocols by authenticating and/or encrypting the payload, or tunnel mode, providing security for the whole IP data packet by encapsulating the IP data packet into a second IP packet.

Figure 3:
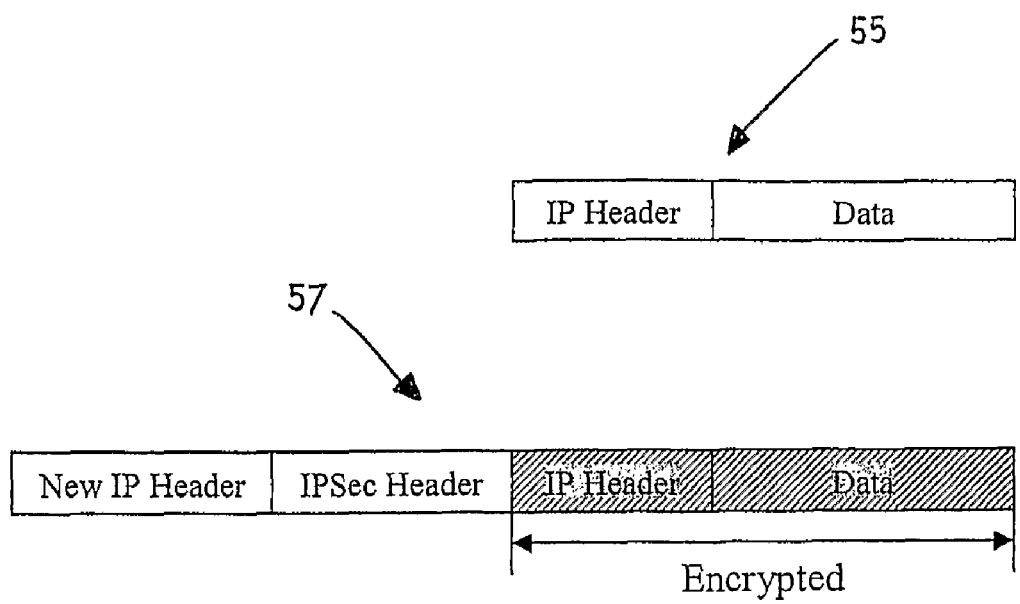
FIG. 3 is a representation of the IP data packets showing the encryption carried out as part of the IPSec tunnelling protocol.

In the tunnel mode of the IPSec protocol, the original IP data packet is encrypted as shown in FIG. 3. The entire original data packet 55 is encrypted and becomes the payload in a new IP data packet 57. The concentrator 49 decrypts the original IP data packet and forwards it onto the intended destination of the data (i.e. the provider of the services 51, 53).

Figure 4:
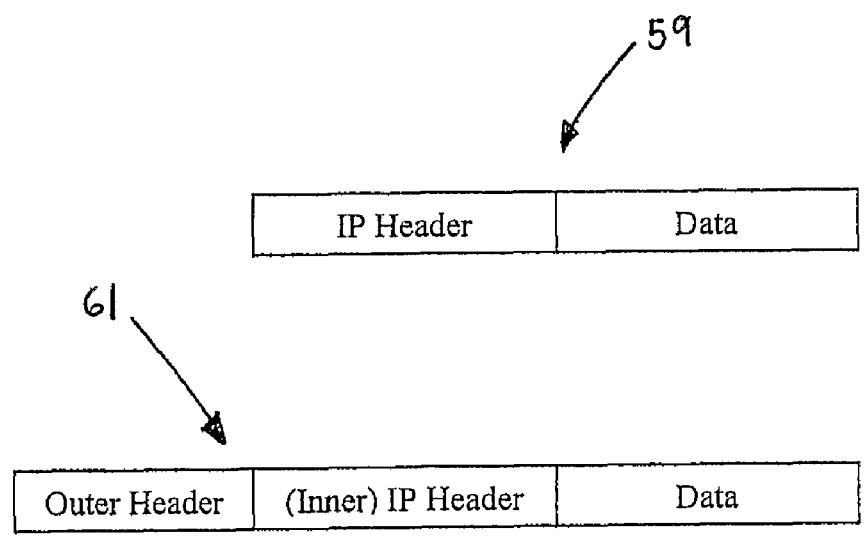
FIG. 4 is a representation of the IP data packets showing the encapsulation carried out as part of the IPinIP protocol.

The IPinIP protocol, as shown in FIG. 4, defines a method whereby an IP data packet 59 is encapsulated within a second IP data packet 61 and hence carried as a payload. An outer IP header is inserted before the IP data packet's existing IP header, and the normal IP routing for data packets is altered by delivering the data packets to an intermediate destination that would otherwise not be selected by the network part of the IP destination address in the original IP header. The outer IP header contains a source address (SA) and a destination address (DA) which identify the endpoints of the IPinIP tunnel. The SA and DA of the inner IP header identify the original sender and recipient of the data packet respectively, and the inner IP header is not changed by the encapsulation process or its delivery to the tunnel exit endpoint. The encapsulator may use any existing IP mechanisms appropriate for delivery of the encapsulated payload to the tunnel exit endpoint. In particular, the use of IP options is allowed, as is the use of fragmentation unless the inner IP header restricts this.

Once the encapsulated IP data packet 61 arrives at the intermediate destination it is decapsulated, yielding the original IP data packet 59 which is then delivered to the destination indicated by the original IP destination address (i.e. the provider of the services 51, 53).

The embodiment described herein is one way in which IP data packets could be distributed between a user and a service provider over multiple radio links. It is not intended to, and should not be taken to, limit the scope of the invention as defined by the following claims. In particular, the use of IPSec and IPinIP as the security protocol are intended as examples of the many security protocols for the transmission of IP data packets that could be incorporated into the present invention.

The invention claimed is:

1. A method of transmitting information between a first device and a second device, the method comprising:
receiving at a first node a plurality of data packets representing the information from said first device, each of said data packets including a first header indicative of the identity of said second device;
adding, at said first node, to each of said data packets a second header indicative of the identity of one of a plurality of different intermediate destinations, wherein said first node is positioned in a communication path between said first device and said plurality of intermediate destinations;
monitoring communication characteristics of a plurality of communications systems;
transmitting said data packets by said first node distributing respective ones of said data packets received from said first device over different ones of the plurality of communications systems to said plurality of intermediate destinations based on the indications of said second headers and in dependence upon the monitored characteristics; and
re-assembling said data packets into a form said data packets took when originally transmitted by said first device and delivering said re-assembled data packets to said second device based on the indication of said first headers,
wherein said data packets are transmitted by at least two of said plurality of communications systems by one or more packet data protocol (PDP) channels formed by each of said at least two communications systems.

2. The method of claim 1, wherein said plurality of communications systems includes at least two wireless communications systems.

3. The method of claim 1, wherein said communications systems comprise cellular or mobile telecommunications systems.

4. The method of claim 1, wherein said communications systems comprise GSM or 3G (UMTS) cellular telecommunications systems.

5. The method of claim 4, wherein said telecommunications systems each have a respective radio access network.

6. The method of claim 1, wherein said data packets comprise Internet Protocol (IP) data packets.

7. The method of claim 1, including receiving said data packets at a control portion of each of said communications systems, and forwarding the received data packets by a communications link to a second node such that the data packets are received by said second device.

8. The method of claim 1, wherein said second device is registerable with one of said communications systems for direct communication therewith.

9. The method of claim 8, wherein delivering said re-assembled data packets includes transmitting to the communications system with which said second device is registered said re-assembled data packets.

10. The method of claim 7, including forming an IPsec channel between said first device and said second node for transmission of said data packets therethrough.

11. The method of claim 1, including authenticating at least one of said devices with a corresponding one of the communications systems with which said at least one device is registered by means of authentication storage means associated with said at least one device.

12. The method of claim 11, wherein said authentication storage comprises a smart card, SIM or USIM.

13. The method of claim 1, including authenticating said first node with each of said communications systems.

14. The method of claim 13, including authenticating said first node with each of said communications systems using respective authentication storage.

15. The method of claim 1, wherein the communications systems are monitored in terms of a level of radio signal thereof.

16. The method of claim 15, wherein the radio signal of each communications system is assessed by test signaling.

17. A system for transmitting information between a first device and a second device, comprising:
a first node configured to:
receive a plurality of data packets representing the information from said first device, each of said data packets including a first header indicative of the identity of said second device;
add to each of said data packets a second header indicative of the identity of one of a plurality of different intermediate destinations;
monitor communication characteristics of a plurality of communications systems; and
transmit said data packets received from said first device by distributing respective ones of said data packets over different ones of the plurality of communications systems to said plurality of intermediate destinations based on the indications of said second headers and in dependence upon the monitored characteristics, wherein said first node is positioned in a communication path between said first device and said plurality of intermediate destinations; and
a second node configured to:
reassemble said data packets into a form said data packets took when originally transmitted by said first device and for delivering said re-assembled data packets to said second device based on the indication of said first headers,
wherein said data packets are transmitted by at least two of said plurality of communications systems by one or more packet data protocol (PDP) channels formed by each of said at least two communications systems.

18. The system of claim 17, wherein said plurality of communications systems includes at least two wireless communications systems.

19. The system of claim 17, wherein said communications systems comprise cellular or mobile telecommunications systems.

20. The system of claim 17, wherein said communications systems comprise GSM or 3G (UMTS) cellular telecommunications systems.

21. The system of claim 20, wherein said telecommunications systems each have a respective radio access network.

22. The system of claim 17, wherein said data packets comprise Internet Protocol (IP) data packets.

23. The system of claim 17, including a control portion for each of said communications systems for receiving said data packets and for forwarding the received data packets by a communications link to the second node such that the data packets are received by said second device.

24. The system of claim 17, wherein said second device is registerable with one of said communications systems for direct communication therewith.

25. The system of claim 24, wherein the second node delivers said re-assembled data packets to said second device by delivering said re-assembled data packets to the communications system with which said second device is registered.

26. The system of claim 23, wherein said first device and said second node are configured to form an IPsec channel between said first device and said second node for transmission of said data packets therethrough.

27. The system of claim 17, wherein the first node is further configured to authenticate at least one of said devices with a corresponding one of the communications systems with which said at least one device is registered using an authentication storage associated with said at least one device.

28. The system of claim 27, wherein said authentication storage comprises a smart card, SIM or USIM.

29. The system of claim 17, wherein the communications systems are monitored in terms of a level of radio signal thereof.

30. The system of claim 29, wherein the first node is further configured to generate a test signal to assess the radio signal of each communications system.

31. The method of claim 13, wherein each of said respective authentication storage includes one of a SIM and a USIM.

* * * * *